(12) United States Patent
Barua et al.

(10) Patent No.: US 8,380,585 B2
(45) Date of Patent: Feb. 19, 2013

(54) SUPPLY CHAIN INTEGRATION

(75) Inventors: Abhik Barua, Overland Park, KS (US); Kimberly R. George, Spring Hill, KS (US); Richard R. Motilal, Overland Park, KS (US); Jason S. Porter, Overland Park, KS (US); Erik I. Vann, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 395 days.

(21) Appl. No.: 12/698,714

(22) Filed: Feb. 2, 2010

(65) Prior Publication Data

US 2011/0191199 A1 Aug. 4, 2011

(51) Int. Cl.
*G06Q 30/00* (2006.01)

(52) U.S. Cl. ...................... 705/26.81; 705/28
(58) Field of Classification Search .......... 705/333, 705/28, 26.81
See application file for complete search history.

(56) References Cited

U.S. PATENT DOCUMENTS

| | | | | |
|---|---|---|---|---|
| 5,797,101 A * | 8/1998 | Osmani et al. | ........... | 455/551 |
| 7,937,751 B2 * | 5/2011 | Tom | ............ | 726/9 |
| 8,032,115 B1 * | 10/2011 | Breau et al. | ............ | 455/411 |
| 2005/0059430 A1 * | 3/2005 | Beeman et al. | ........ | 455/558 |
| 2008/0132203 A1 * | 6/2008 | Whittington et al. | .... | 455/410 |

OTHER PUBLICATIONS

Franklin, William, "Rewriting the rules of the (Cellular) game" Cellular Business, dated Oct. 1992.*
Adelson, Andrea, "Finding Cellular Phone Clones", Chicago Tribune, 1997.*
IEEE: New IEEE registry supports use of analog sensors in digital networks M2 Presswire [Coventry] Nov. 29, 2004.*
Barua, Abhik, et al., Patent Application entitled "Order Fulfillment Logistics Workflow," filed Feb. 1, 2010, U.S. Appl. No. 12/697,981.

* cited by examiner

*Primary Examiner* — Mark Fadok (57) ABSTRACT

A method is provided comprising a first computer uploading a file to a database wherein the file identifies devices associated with an order and serial numbers associated with the devices. The method also comprises a second computer comparing the range of serial numbers in the file to a range of serial numbers identified by the order. When the ranges identified by the file and the order do not correlate, the second computer transmits a message to the first computer indicating the ranges do not correlate. When the ranges identified by the file and the order do correlate, the second computer transmits a message to the first computer indicating the ranges correlate. Based on the first computer receiving the message indicating that the range of serial numbers identified by the file correlates to the range of serial numbers identified by the order, the first computer ships the devices.

18 Claims, 5 Drawing Sheets

SUPPLY CHAIN INTEGRATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Inventory purchasing and procurement is the acquisition of goods and/or services at a specific total cost for use in manufacturing, resale, or other commercial endeavor for the benefit of the inventory purchaser. Direct procurement may occur in manufacturing or distribution settings and may include the acquisition of items that are part of finished products, such as raw material, components, and parts. Supply chain management, which may encompass procurement, is the management of a network of interconnected businesses involved in the ultimate provision of product and service packages required by end customers. Supply chain management spans the movement and storage of raw materials, work-in-process inventory, and finished goods from point of origin to point of consumption. For a manufacturer or distributor of finished tangible products, managing the supply chain may include integration of key business processes across the supply chain for the purpose of controlling costs, adding value for customers and stakeholders, and increasing profitability. A supply chain may be a set of organizations linked by one or more of the upstream and downstream flows of products, services, finances, and information.

SUMMARY

In an embodiment, an automated method of managing a supply chain is provided. The method comprises a first computer uploading a data file to a supply chain database, wherein the data file identifies a plurality of electronic devices associated with an order and a plurality of electronic serial numbers associated with the electronic devices. The method also comprises a second computer comparing the range of electronic serial numbers identified by the data file to a range of electronic serial numbers identified by the order. When the range of electronic serial numbers identified by the data file does not correlate to the range of electronic serial numbers identified by the order, the method also comprises transmitting a message to the first computer indicating that the range of electronic serial numbers identified by the data file does not correlate to the range of electronic serial numbers identified by the order. When the range or electronic serial numbers identified by the data file correlates to the range of electronic serial numbers identified by the order, the method also comprises transmitting a message to the first computer indicating that the range of electronic serial numbers identified by the data file correlates to the range of electronic serial numbers identified by the order. Based on the first computer receiving the message indicating that the range of electronic serial numbers identified by the data file correlates to the range of electronic serial numbers identified by the order, the method also comprises shipping the electronic devices.

In an embodiment, a processor-implemented method of procuring inventory is provided. The method comprises a computer comparing information about electronic devices described in a first universal equipment data file (UEDF) received from a supplier with information contained in a first purchase order for the electronic devices. The method also comprises the computer verifying that the information in the first universal equipment data file correlates to the information in the first purchase order. The method also comprises the computer sending a first message to the supplier, the first message confirming the information in the first universal equipment data file and instructing the supplier to ship of the electronic devices described in the first purchase order. The method also comprises the computer receiving a second message from a receiving component, the second message indicating that the electronic devices described in the first purchase order have been received from a carrier, the second message further advising that serial numbers associated with the electronic devices match those listed in the first universal equipment data file. The method also comprises the computer sending a third message to an accounting component, the third message instructing the accounting component to pay an invoice amount to the supplier for the electronic devices and to pay an invoice amount to the carrier for transportation services associated with the electronic devices.

In an embodiment, a computer based method of invoicing for business transactions is provided. The method comprises a first computer transmitting a universal equipment data file (UEDF) identifying a plurality of electronic devices and electronic serial numbers associated with the electronic devices. The method also comprises a second computer validating the universal equipment data file based on an order for the electronic devices. The method also comprises a third computer transmitting a message identifying a shipment, the message identifying the electronic serial numbers associated with the electronic devices. The method also comprises the second computer validating the shipment based on correlating the electronic serial numbers identified by the message with the order for the electronic devices. The method also comprises the first computer generating a first invoice for the electronic devices. The method also comprises paying the first invoice. The method also comprises the second computer generating a second invoice for a transportation of the electronic devices. The method also comprises paying the second invoice.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches a system and methods of inbound supply chain automation that promote a buyer of goods, for example a telecommunications service provider, to transmit a purchase order to a manufacturer and subsequently receive a data file, such as a universal equipment data file (UEDF), confirming the information in the order. The interaction and confirmation of the transaction takes place in a single electronic venue and in a limited period of time. The provider may submit a purchase order for portable electronic devices, for example mobile telephones, to the manufacturer, and the purchase order may request the portable electronic devices to be provided a specific range of electronic serial numbers. The manufacturer electronically responds with its universal equipment data file confirming the range of electronic serial numbers that it will assign to the portable electronic devices in the sale. The system compares the received universal equipment data file to the purchase order and confirms whether the range of electronic serial numbers listed in the manufacturer's confirming universal equipment data file match the requested range of electronic serial numbers the provider specified in its purchase order. The system identifies and validates discrepancies between electronic serial number ranges specified in the purchase order and those listed in the universal equipment data file. Once discrepancies are resolved, the manufacturer may proceed with shipping the merchandise with minimal further delay. A process that may previously have consumed days or weeks with extensive exchanges of electronic mail messages and telephone calls may be completed quickly and in a secure, collaborative electronic workspace.

The system taught by the present disclosure provides functionality that may be of importance to a serialized process used by the telecommunications service provider in the provisioning and linking of electronic serial numbers of mobile telephones to customer subscription accounts. The manufacturer assigns a range of specific electronic serial numbers to the designated group of mobile telephones as the manufacturer fulfills the purchase order for the telecommunications service provider. Each electronic serial number in the range provided by the manufacturer may be closely linked by the telecommunications service provider to a specific subscriber account number. Successful completion of authorization actions required by the telecommunications service provider and authentication steps followed by the subscriber may be predicated on the tight linkage of the electronic serial number to the subscriber's account information. The system promotes inventory control and the close binding of the range of electronic serial numbers of the shipped mobile telephones to the subscriber account information wherein the close binding may be essential to the telecommunications service provider's required authorization and authentication processes.

The present disclosure teaches an application that promotes the exchanging of the purchase order and the universal equipment data file, compares the documents, identifies and validates discrepancies, and confirms and prompts completion of the transaction within the secure electronic confines of the application's workspace. Action steps and communication regarding the fulfillment of the order, shipment of the goods, including the completion of an advanced shipping notice (ASN) process, receipt and warehousing of the purchased goods, and payment for the order may take place within work areas provided by the application. In addition to various functional units within the telecommunications service provider and manufacturer accessing the application, a logistics provider, a transportation vendor, and other parties with an interest in the transaction may also be provided limited access to the application to view activity, provide communication, and execute aspects of the transaction related to their roles.

The application, in addition to providing access to the various parties to a purchase and sale transaction and associated activities, also provides added visibility to the transaction and its workflow to managers, executives, and other authorized parties of the telecommunications service provider, manufacturer, and other stakeholders. The added visibility may promote transactions receiving attention more rapidly and widely and may promote more expeditious resolutions of problems. The increased visibility and resulting attention and action may permit purchased goods to be shipped and received more quickly and financial aspects of transactions to be completed promptly including parties receiving payment. The added visibility may also promote better general communication between the parties and improved account relationships. The application also provides reporting and alert generation functionality to promote measurement of manufacturer performance and to call attention to fulfillment delays and other problems. While a server that hosts the application may be controlled by the telecommunications service provider, the application may be web-based and accessible to the parties via secure web browser. The telecommunications service provider may use the application to conduct purchases of portable electronic devices and engage in advanced shipping notice processes with a plurality of manufacturers. Each manufacturer and transaction may be provided a secure workspace within the application.

The system and methods taught by the present disclosure automate and integrate into streamlined processes a plurality of procurement steps that may previously have been disparate, disjointed, and executed out of logical order and without coordination. For example, procurement steps integrated into streamlined process may incorporate the sending of early warnings or alerts for a distribution facility of incoming shipments of goods. The ability to generate, receive, and react appropriately and expeditiously to these warnings and/or alerts may promote a more efficient, responsive, and profitable order fulfillment workflow design and implementation. For example, knowing that a shipment of mobile phones to fulfill a large direct-to-business order that had been expected to be received on Monday is now expected to be received instead on Wednesday may promote delaying adaptation of an order fulfillment workflow to a configuration optimized for processing the large direct-to-business order until early Wednesday morning. For more details on an adaptable order fulfillment logistic workflow system, see U.S. patent application Ser. No. 12/697,981 filed Feb. 1, 2010 entitled "Order Fulfillment Logistics Workflow," by Abhik Barua et al., which is hereby incorporated herein for all purposes.

Processes that may previously have been run sequentially may instead take place in a parallel manner, promoting efficiencies. The ability of each party to a transaction to be provided customized permission levels to communicate, add and write to documents, and execute transaction activity may reduce manual intervention and the need for electronic mail messaging and telephone communication. This may reduce errors and manpower requirements and increase efficiency and transaction profitability for the parties. The application also contains automatic checking and reconciliation functionality that prompts the stakeholders to a transaction to proceed without delay when action is appropriate. The application may set flags prompting action and may generate alerts and send messages to various parties when deemed necessary.

Figure 1:
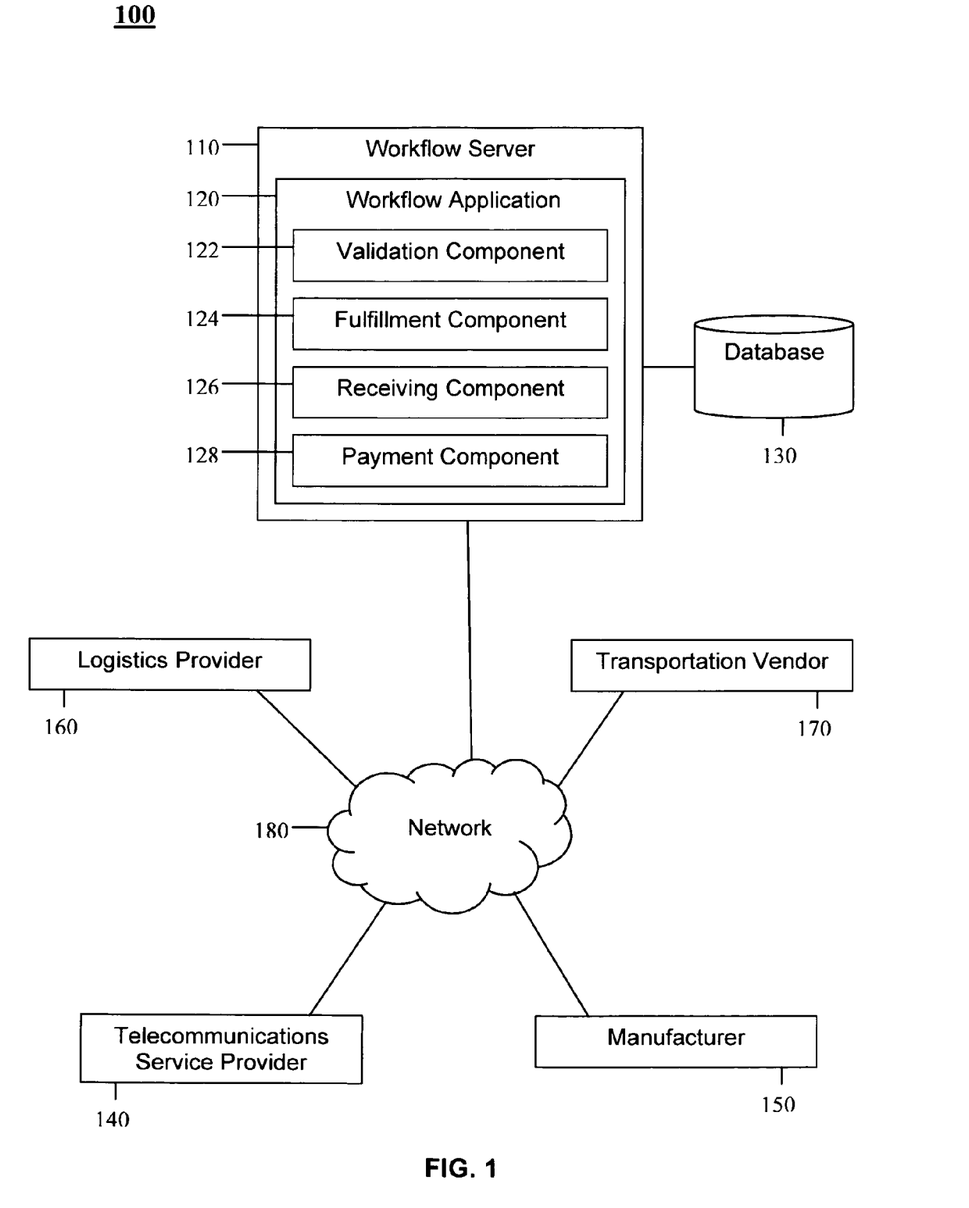
FIG. 1 is a block diagram of a system according to an embodiment of the disclosure.

Turning now to FIG. 1, a system 100 of supply chain automation is provided. The system 100 comprises a workflow server 110, a workflow application 120, a database 130, a telecommunications service provider 140, a manufacturer 150, a logistics provider 160, a transportation vendor 170, and a network 180.

The workflow server 110 may be implemented by a computer system. Computer systems are discussed in greater detail hereinafter. The workflow application 120 executes on the workflow server 110 and observes the origination of a purchase order for portable electronic devices by the telecommunications service provider 140. The purchase order specifies a listing or range of electronic serial numbers to be associated with the portable electronic devices ordered. The workflow application 120 publishes the purchase order for viewing and retrieval by the manufacturer 150 and provides notification to the manufacturer 150 and other interested parties. The workflow application 120 receives from the manufacturer 150 the universal equipment data file providing the electronic serial numbers to be associated with the portable electronic devices that will be shipped in fulfillment of the purchase order. The workflow application 120 compares the electronic serial numbers provided in the universal equipment data file with those specified in the purchase order. When the electronic serial numbers in the two documents correlate as desired by the parties, the workflow application 120 may instruct the manufacturer 150 to proceed with fulfilling the purchase order by shipping the portable electronic devices. When the electronic serial numbers do not match, the manufacturer 150, at the direction of the workflow application 120, may make corrections before the order is fulfilled and shipped.

The workflow application 120 promotes visibility of problematic or stalled purchase transactions to supervisors and managers that may intervene and take action to resolve issues. When discrepancies between the purchase order and the universal equipment data file are identified by the workflow application 120, visibility provided to supervisors and managers of the telecommunications service provider 140 and the manufacturer 150 may promote a faster and more efficient resolution of the discrepancies. Manager and supervisor involvement at either or both the telecommunications service provider 140 and the manufacturer 150 may promote dialogue between the parties, detection of the source of the problem, and action toward resolution of the problem. The workflow application 120 also provides immediate feedback to the telecommunications service provider 140 and the manufacturer 150 when discrepancies are identified. When the workflow application 120 discovers a discrepancy between the purchase order and the universal equipment data file, it may bring the problem to the attention of the telecommunications service provider 140 and the manufacturer 150 without delay. The workflow application 120 may continue generating alerts and escalate the frequency and scope of the alerts until it detects that the discrepancy has been resolved and the order may be fulfilled. Problematic or stalled transactions may be in error state for a shorter time because of the broader visibility taught herein. The immediate feedback provided by the workflow application 120 promotes a faster and more efficient fulfillment by the manufacturer 150 and completion of the procurement process for the telecommunications service provider 140.

Discrepancies may be resolved in a short time, for example minutes or hours, instead of over an extended period, for example days or weeks. Upon receipt of the portable electronic devices, the workflow application 120 verifies again that the electronic serial numbers associated with the received portable electronic devices match those in the purchase order. The electronic serial numbers may be stored in a read-only memory (ROM), in a non-volatile memory, or in a different electronic memory of the portable electronic devices. The workflow application 120 may then arrange for prompt payment to the manufacturer 150, to the transportation vendor 170 that delivered the portable electronic devices, to the logistics provider 160 that may have provided warehousing services, and other parties to the transaction. Because the workflow application 120 resolves electronic serial number discrepancies and other issues between the buyer and the vendor of the portable electronic devices in a single electronic venue and does so before the portable electronic devices are shipped, savings in both time and expense may be realized.

The term serial number as used herein may be broadly construed to comprise an electronic serial number (ESN) and/or a mobile equipment identifier (MEID), such as may be used to uniquely identify mobile telephones incorporating one of the advanced mobile phone system (AMPS), time division multiple access (TDMA), and code division multiple access (CDMA) technologies. The term serial number as used herein may also comprise the international mobile equipment identity (IMEI) designation associated with mobile telephones that may use one of the global system for mobile communications (GSM), wideband code division multiple access (W-CDMA), and integrated digital enhanced network (iDEN) technologies. The term serial number as used herein may comprise additional serial number designations used for other mobile telephone technologies and other electronic devices as described herein that may comprise personal digital assistants (PDA) and media players. The term serial number may also be used to designate a serial number associated with a manufactured item to uniquely identify that article, for example by imprinting, engraving, adhering, or otherwise affixing a unique serial number comprising numerals and/or alphabetical characters to the article.

The terms universal equipment data file and data file as used herein may comprise an electronic file describing serial number and other identifying information associated with mobile telephones and other electronic devices as described herein. The format and contents of the universal equipment data file or data file may be specified and agreed to by the telecommunications service provider 140, the manufacturer 150, the logistics provider 160, the transportation vendor 170, and other parties.

The telecommunications service provider 140 may periodically submit purchase orders for portable electronic devices to a plurality of manufacturers 150. The correct serialization of portable electronic devices in the information systems of the telecommunications service provider 140 may be of importance in linking subscriber accounts to portable electronic devices. When the telecommunications service provider 140 places an order with the manufacturer 150 for portable electronic devices, the telecommunications service provider 140 may specify a range of electronic serial numbers that it wishes to be assigned to the portable electronic devices. It may be essential to the telecommunications service provider 140 that the electronic serial numbers of the portable electronic devices received in response to the purchase order match those specified in the purchase order. The present disclosure teaches the workflow application 120 resolving issues associated with discrepancies between the electronic serial number range specified in the purchase order and the electronic serial number range processed, confirmed, and eventually shipped by the manufacturer 150 in fulfillment of the purchase order. The portable electronic devices ordered in the purchase order and provided electronic serial numbers in the universal equipment data file may be mobile telephones, personal digital assistants (PDA), or media players.

The workflow application 120 may be partially accessible to the manufacturer 150 and other parties with roles in the procurement activities of the telecommunications service provider 140. Transactions, communications, and other interactions may take place partially or entirely within the electronic venue of the workflow application 120. The telecommunications service provider 140, the manufacturer 150, the logistics provider 160, the transportation vendor 170, financial institutions, and other interested parties have access to the workflow application 120 with varying levels of permissions. When the telecommunications service provider 140 sends its purchase order to the manufacturer 150, it may effectively place its electronic purchase order into a restricted area of the workflow application 120 that may be accessible by the manufacturer 150. The manufacturer 150 may view and retrieve the purchase order from the restricted area. The manufacturer 150 may likewise place its universal equipment data file in the same or another restricted area of the workflow application 120 that is accessible by the telecommunications service provider 140. The telecommunications service provider 140 may then view and retrieve the universal equipment data file from the restricted area. The telecommunications service provider 140 and the manufacturer 150 may exchange documents, post comments, and conduct electronic communications within the workflow application 120 and the workflow server 110. The other parties described may be permitted limited access to the workflow application 120 to post and retrieve documents and communicate as necessary. Various internal functions of the telecommunications service provider 140, for example procurement, warehousing, customer order fulfillment, finance, and accounting may have various levels of access to the workflow application 120. The workflow application 120 may be a web-based application with access to the database 130. The parties external to the telecommunications service provider 140 may have secure access to the workflow application 120 using web browser software.

Copies of the purchase order, the universal equipment data file, and other documents are stored on workflow server 110 or in the database 130 and remain accessible to the various parties on a limited basis. The accessibility of the documents and the ability to exchange dialogue about the documents and associated activities may promote efficiencies in the interactions and provide cost and time savings to the parties. The present disclosure teaches a system and methods that may improve previous procurement practices wherein communication takes place using electronic mail and telephone calls, wherein documents may not be secure, and wherein communication delays add time and expense to the procurement and shipping process. The workflow application 120 provides a virtual workplace for the telecommunications service provider 140, the manufacturer 150, and the other parties to securely and expeditiously transmit purchase orders, compare purchase orders with universal equipment data files, resolve issues with electronic serial numbers, handle shipment and payment, and otherwise complete procurement transactions.

The workflow application 120 also promotes reporting to specified contacts within the telecommunications service provider 140, the manufacturer 150, and the other parties. An individual with the appropriate permissions may generate reports about the total purchase orders outstanding, the purchase orders undergoing normal processing as well as those presently in error status, those scheduled for receiving, and other information. Reporting capabilities are integrated into the various components of the workflow application 120 and may replace previous processes that may have required a manual creation and transmission of spreadsheet data.

The workflow application 120 may also promote the telecommunications service provider 140 and the manufacturer 150 to negotiate more precise and exacting service level agreements under which the parties do business. Service standards agreed to by the parties may be measured, metrics may be generated, and performance by manufacturers 150 in meeting the terms of their vendor agreements may be analyzed. The telecommunications service provider 140 may use reports about the performance of manufacturers 150 in future contract negotiations with manufacturers 150. The alert generating functionality taught by the present disclosure may promote the identification and resolution of performance deficiencies on the part of the manufacturer 150 or other parties.

While the discussion herein may suggest that the workflow server 110 and the workflow application 120 are controlled and hosted by the telecommunications service provider 140, FIG. 1 depicts the telecommunications service provider 140 and the workflow server 110 as separate components. In an embodiment, the workflow server 110 may not be owned and/or controlled by the telecommunications service provider 140. The workflow server 110 and operation of the workflow application 110 including creation and hosting of the advanced shipping notice process may rather be the in control of a services vendor. The telecommunications service provider 140 may outsource the operation of the workflow server 110 and the workflow application 120 to the services vendor. The services vendor, that may provide some or all of the services that the logistics provider 160 may also offer, may provide value-added services to the telecommunications service provider 140 in combining and improving the advanced shipping notice and the universal equipment data file processes. Alternatively, the telecommunications service provider 140 may own and operate the workflow server 110 and the workflow application 120.

The manufacturer 150 may be an original equipment manufacturer (OEM) of portable electronic devices that may manufacture and sell the portable electronic devices under its own name. The manufacturer 150 may alternatively manufacture the portable electronic devices and license the telecommunications service provider 140 to distribute the portable electronic devices under the name, label, or other branding of the telecommunications service provider 140. The manufacturer 150 may purchase components or subassemblies of or partially manufactured portable electronic devices from other parties, perform assembly, and sell the finished goods to the telecommunications service provider 140. The manufacturer 150 may be a distributor that purchases portable electronic devices from one or a plurality of original equipment manufacturers or others and resells the portable electronic devices to a plurality of telecommunications service providers 140 or others, possibly with some value-added services.

The logistics provider 160 manages inventory for the telecommunications service provider 140, the inventory comprising portable electronic devices, accessories, and other items. The logistics provider 160 may have its own warehouse facilities and may transfer inventory between its own warehouse facilities and the warehouse facilities of the telecommunications service provider 140 at various times to achieve inventory balance and other objectives. The logistics provider 160 may be a freight forwarding services provider.

The transportation vendor 170 is a trucking, rail, air, or other carrier that transports portable electronic devices and other goods. The transportation vendor 170 may transport portable electronic devices between the manufacturer 150 and the telecommunications service provider 140, between the manufacturer 150 and the logistics provider 160, and between the logistics provider 160 and the telecommunications service provider 140.

The workflow application 120 comprises the validation component 122 that receives and stores the purchase order originated by the telecommunications service provider 140, notifies the manufacturer 150 that a new purchase order has been generated for it by the telecommunications service provider 140, and may transmit a copy of the purchase order to the manufacturer 150. The validation component 122 may place the purchase order in a secure area of the workflow server 110 or the database 130 that may be accessible to the manufacturer 150, the telecommunications service provider 140, and others. The secure work area may be dedicated and restricted to the transaction initiated by the purchase order. The validation component 122 may provide functionality for the manufacturer 150 and the telecommunications service provider 140 to post communications in the secure area where the purchase order is placed. The purchase order may be for portable electronic devices, for example mobile telephones, and may specify a range of electronic serial numbers that the telecommunications service provider 140 wishes the manufacturer 150 to assign to the portable electronic devices.

The validation component 122 also receives the universal equipment data file from the manufacturer 150 in reply to the purchase order and posts it to the secure area dedicated to the transaction. The validation component 122 may notify the telecommunications service provider 140 that the workflow server 110 has received the universal equipment data file in reply to its purchase order. The validation component 122 may, without action by the manufacturer 150 or the telecommunications service provider 140, compare the range of electronic serial numbers in the purchase order with the range of electronic serial numbers in the universal equipment data file to determine if the two ranges correlate as may be the wish of the telecommunications service provider 140. When the electronic serial numbers ranges in the two documents correlate, the validation component 122 may notify both parties and instruct the manufacturer 150 that it may proceed with manufacturing and/or shipping the portable electronic devices described in the purchase order. When the electronic serial numbers in the two documents do not correlate, the validation component 122 may resolve the discrepancy.

The validation component 122 may contain flags that notify the parties when discrepancies are found between the purchase order and the universal equipment data file. Alerts may be sent out and management personnel may be notified. The validation component 122 may apply algorithms, troubleshooting techniques, or resolution procedures to identify the discrepancies in an automated and expeditious manner. If the validation component 122 is unable to resolve the discrepancies using automated or quantitative techniques, it may generate a further set of alerts that draw additional and perhaps an escalated level of attention from both the telecommunications service provider 140 and the manufacturer 150. The validation component 122 may prompt electronic or voice communication between the parties to bring about resolution. The validation component 122 may also perform other checking and testing of the information contained in the universal equipment data file and the purchase order to verify that information in the fields align correctly and that the necessary information is complete.

The workflow application 120 also comprises the fulfillment component 124 that assists the manufacturer 150 in creating shipments of the portable electronic devices after the validation component 122 has determined that the purchase order and the universal equipment data file correlate. The fulfillment component 124 may assist with the creation of invoices, schedules, and other supporting documents from the manufacturer 150 requesting payment. The fulfillment component 124 may place those invoicing documents in the workspace in the workflow server 110 or database 130 for viewing and retrieval by the telecommunications service provider 140 and other parties. The fulfillment component 124 may work with the validation component 122 in creating an advanced shipping notice file that contains the information about the shipment of the portable electronic devices.

While the advanced shipping notice file may traditionally be created by the manufacturer 150 and supplied to the purchaser separately from the universal equipment data file, the present disclosure teaches the integration of the universal equipment data file with the advanced shipping notice process. The advanced shipping notice may be used to list the contents of a shipment of goods as well as additional information relating to the shipment, such as order information, product description, physical characteristics, type of packaging, marking, and information about the transportation vendor 170. A purpose of the advanced shipping notice is to provide information to the receiving operations of the telecommunications service provider 140 in advance of delivery. The advanced shipping notice enables the manufacturer 150 to describe the contents and configuration of the shipment in various levels of detail and provides an ordered flexibility to convey information. The information in the advanced shipping notice may comprise at least one of product stock-keeping unit (SKU) numbers, product equipment serial numbers, product quantities, purchase order information, ship date(s), appointment for delivery, and universal equipment data file name and number. The advanced shipping notice also provides information about the transportation vendor 170, its rates, its requirements, and other terms of its service.

While the advanced shipping notice may be the responsibility of the manufacturer 150, the fulfillment component 124 publishes the advanced shipping notice or portions of it for access by the telecommunications service provider 140 and the other stakeholders in the purchase transaction. By providing visibility to portions of the advanced shipping notice file to the parties with the necessary permissions, the fulfillment component 124 may assist in assuring accuracy in the file. Since the advanced shipping notice may be an accepted standard practice in the shipping industry, the telecommunications service provider 140 may use the advanced shipping notice process in its procurement activities with a plurality of manufacturers 150. By publishing the advanced shipping notice for full or partial review by the telecommunications service provider 140 and other authorized parties, the fulfillment component 124 may streamline the process of moving goods from the manufacturer 150 to the telecommunications service provider 140 and call attention to potential problems that might not otherwise be noticed by the parties until later in the transaction when time has been lost and additional expense possibly incurred. The wide visibility of the advanced shipping notice may help avoid such problems as the shipped goods arriving at their destination before the receiving party is prepared to receive the goods. The receiving party, that may be the telecommunications service provider 140 in this problem scenario, may not have its documentation in order because of delays and may as a result be forced to refuse delivery of the goods. The visibility of the advanced shipping notice taught herein may promote a faster resolution of problems and an earlier preparedness by the telecommunications service provider 140 to take delivery of the shipped goods. The visibility into the shipping process provided by electronic sharing of the advanced shipping notice may provide the telecommunications service provider 140, the logistics provider 160, or other receiving party additional time in advance of an incoming shipment to reconfigure warehouse facilities and/or distribution center order fulfillment systems, adjust employee scheduling, and make other asset reallocations to optimize for changes in incoming mix of products and priorities of products.

The workflow application 120 also comprises the receiving component 126 that processes inbound shipments from the manufacturer 150 and stores the received portable electronic devices in the warehouse facilities of the logistics provider 160, the transportation vendor 170, the telecommunications service provider 140, or other party. When the shipped portable electronic devices arrive at the receiving dock of the destination party, the packaging of the goods may be physically scanned and compared with information in the advanced shipping notice. The shipping packages may be opened and the electronic serial numbers associated with the portable electronic devices in the shipment may be compared with the electronic serial numbers described in the advanced shipping notice. Notifications may automatically be sent by the receiving component 126 to various functions within the telecommunications service provider 140, for example purchasing, order management, and accounting. Notifications may also be sent to the manufacturer 150 confirming that its shipment has arrived and been accepted.

The receiving component 126, in addition to handling the final receipt of goods on the premises of the telecommunications service provider 140, may also work with the logistics provider 160 that may take temporary delivery of the goods. The logistics provider 160 may operate its own warehouse facilities and take delivery of and maintain possession of the goods until the telecommunications service provider 140 indicates that it needs the goods. This may allow the telecommunications service provider 140 to delay taking legal title to the goods until it is ready and may have favorable accounting and tax implications for the telecommunications service provider 140. The logistics provider 160 may also operate the warehouse of the telecommunications service provider 140 under contract and may handle a plurality of warehouse responsibilities including employing warehouse personnel. The receiving component 126 may handle transfers between the warehouse of the logistics provider 160 and the warehouse of the telecommunications service provider 140. Transfers of portable electronic devices may take place in both directions to balance the inventory load of the telecommunications service provider 140.

The workflow application 120 also comprises the payment component 128 that makes payment to parties that are owed funds in purchase transactions and may provide accounting, record keeping, and reporting tasks. When the receiving component 126 determines that the portable electronic devices have been received and their electronic serial numbers correlate with the advanced shipping notice, an alert may be triggered and the payment component 128 may begin processing payment to the manufacturer 150, the logistics provider 160, the transportation vendor 170, and other parties owed funds under the purchase transaction. When the telecommunications service provider 140 deals with a refurbishment vendor that processes portable electronic devices that have previously been in the possession of users, the payment component 128 may process payment to the refurbishment vendor.

When the payment component 128 activates, various parties within the telecommunications service provider 140 may be alerted. Internal transfers and accompanying accounting entries may take place between operational and business units within the telecommunications service provider 140. The units that may be involved in accounting entries and internal transfers may comprise a network systems unit, a transportation systems unit, a warehouse systems unit, and others.

Figure 2:
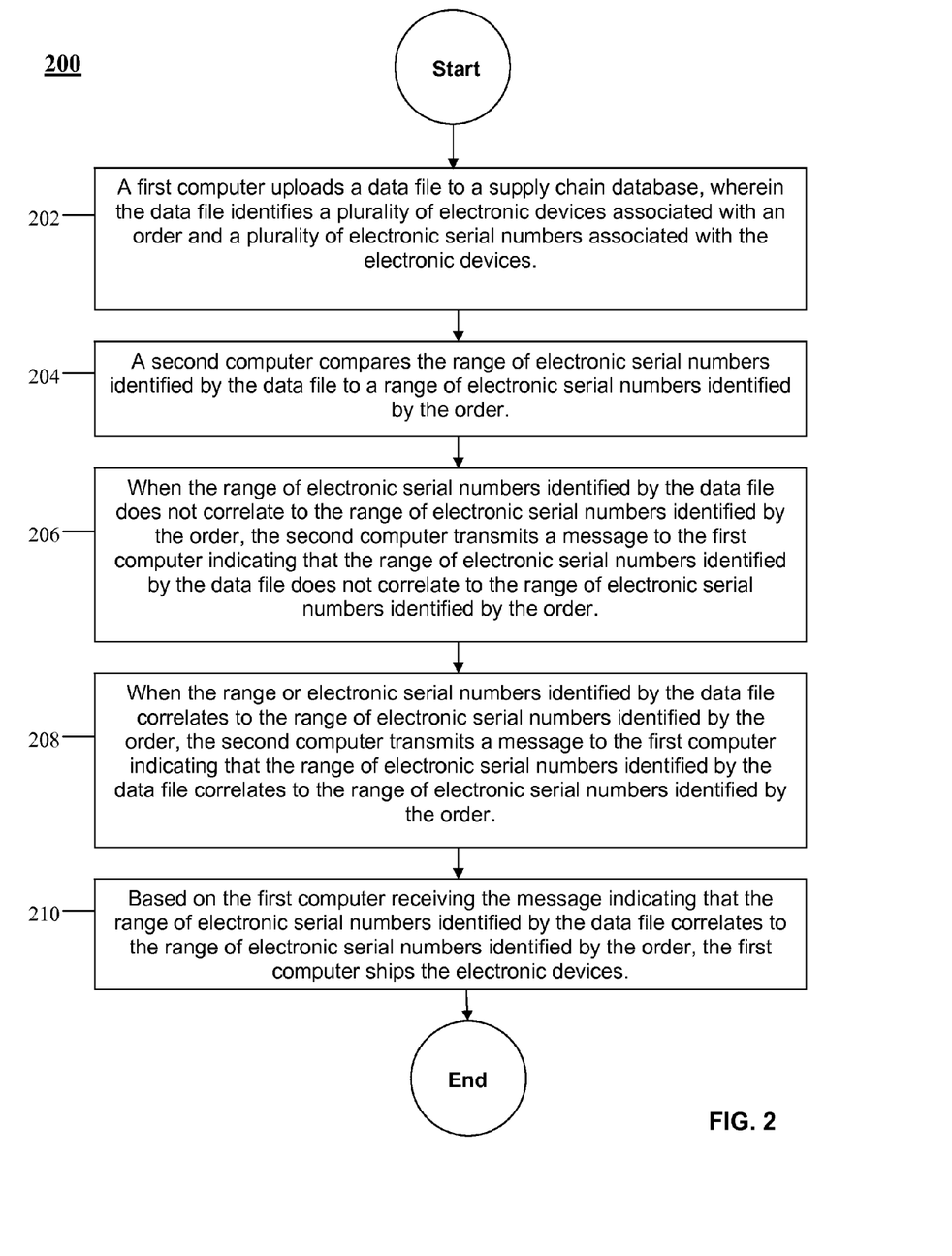
FIG. 2 is a flow chart illustrating a method according to an embodiment of the disclosure.

Turning now to FIG. 2, a method 200 of managing a supply chain is provided. Beginning at block 202, a first computer uploads a data file to a supply chain database, wherein the data file identifies a plurality of electronic devices associated with an order and a plurality of electronic serial numbers associated with the electronic devices. The first computer may be associated with the manufacturer 150.

At block 204, a second computer compares the range of electronic serial numbers identified by the data file to a range of electronic serial numbers identified by the order. The second computer may be the workflow server 110 associated with the telecommunications service provider 140.

When the range of electronic serial numbers identified by the data file does not correlate to the range of electronic serial numbers identified by the order, the second computer at block 206 transmits a message to the first computer indicating that the range of electronic serial numbers identified by the data file does not correlate to the range of electronic serial numbers identified by the order. When the range or electronic serial numbers identified by the data file correlates to the range of electronic serial numbers identified by the order, the second computer at block 208 transmits a message to the first computer indicating that the range of electronic serial numbers identified by the data file correlates to the range of electronic serial numbers identified by the order.

Based on the first computer receiving the message indicating that the range of electronic serial numbers identified by the data file correlates to the range of electronic serial numbers identified by the order, the second computer at block 210 ships the electronic devices.

Figure 3:
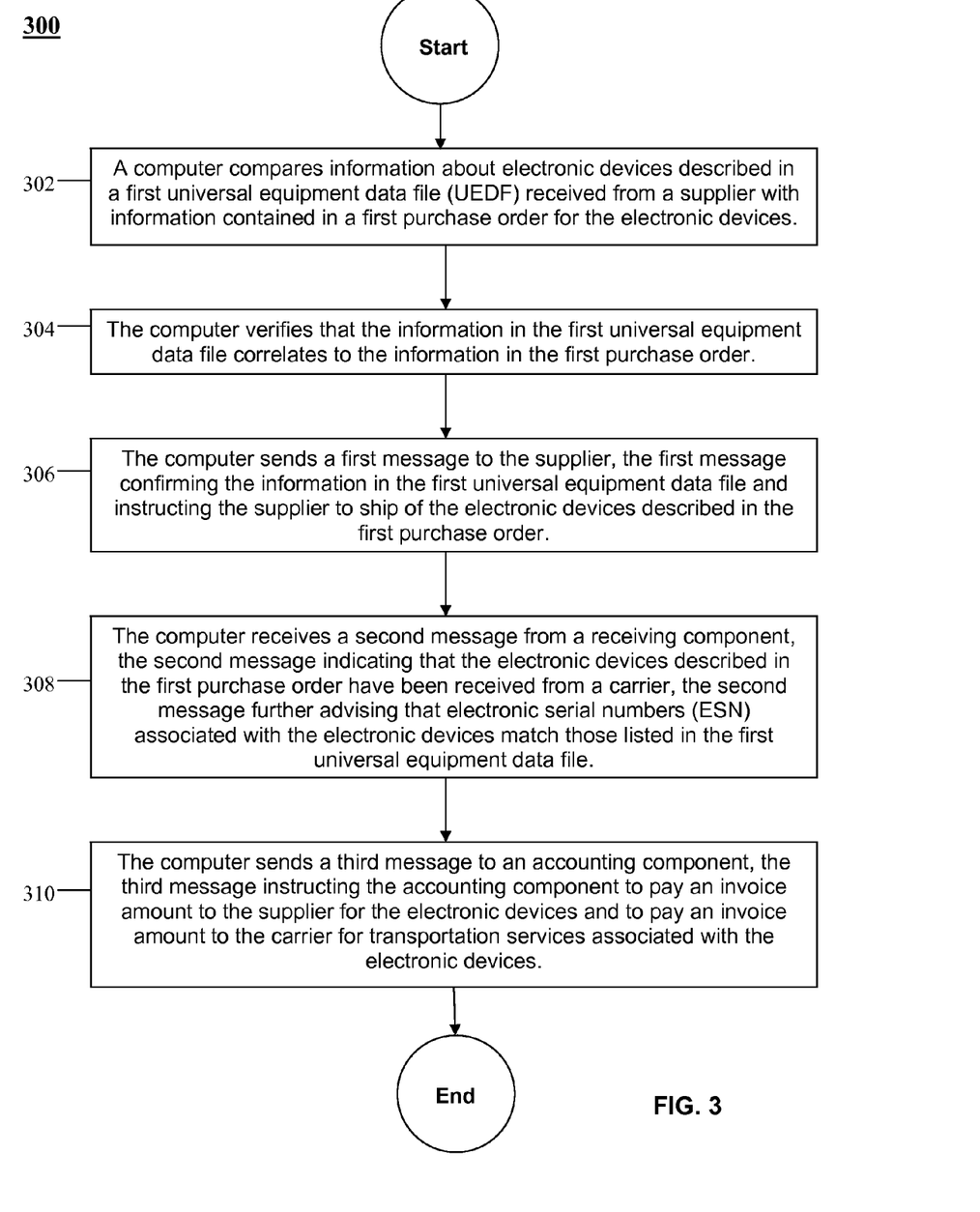
FIG. 3 is a flow chart illustrating a method according to an embodiment of the disclosure.

Turning now to FIG. 3, a processor-implemented method 300 of procuring inventory is provided. Beginning at block 302, a computer compares information about electronic devices described in a first universal equipment data file received from a supplier with information contained in a first purchase order for the electronic devices. The computer may be the workflow server 110 and the supplier may be the manufacturer 150.

At block 304, the computer verifies that the information in the first universal equipment data file correlates to the information in the first purchase order. At block 306, the computer sends a first message to the supplier, the first message confirming the information in the first universal equipment data file and instructing the supplier to ship of the electronic devices described in the first purchase order.

At block 308, the computer receives a second message from a receiving component, the second message indicating that the electronic devices described in the first purchase order have been received from a carrier, the second message further advising that electronic serial numbers associated with the electronic devices match those listed in the first universal equipment data file. The carrier may be the transportation vendor 170.

At block 310, the computer sends a third message to an accounting component, the third message instructing the accounting component to pay an invoice amount to the supplier for the electronic devices and to pay an invoice amount to the carrier for transportation services associated with the electronic devices. The accounting component may be the payment component 128.

Figure 4:
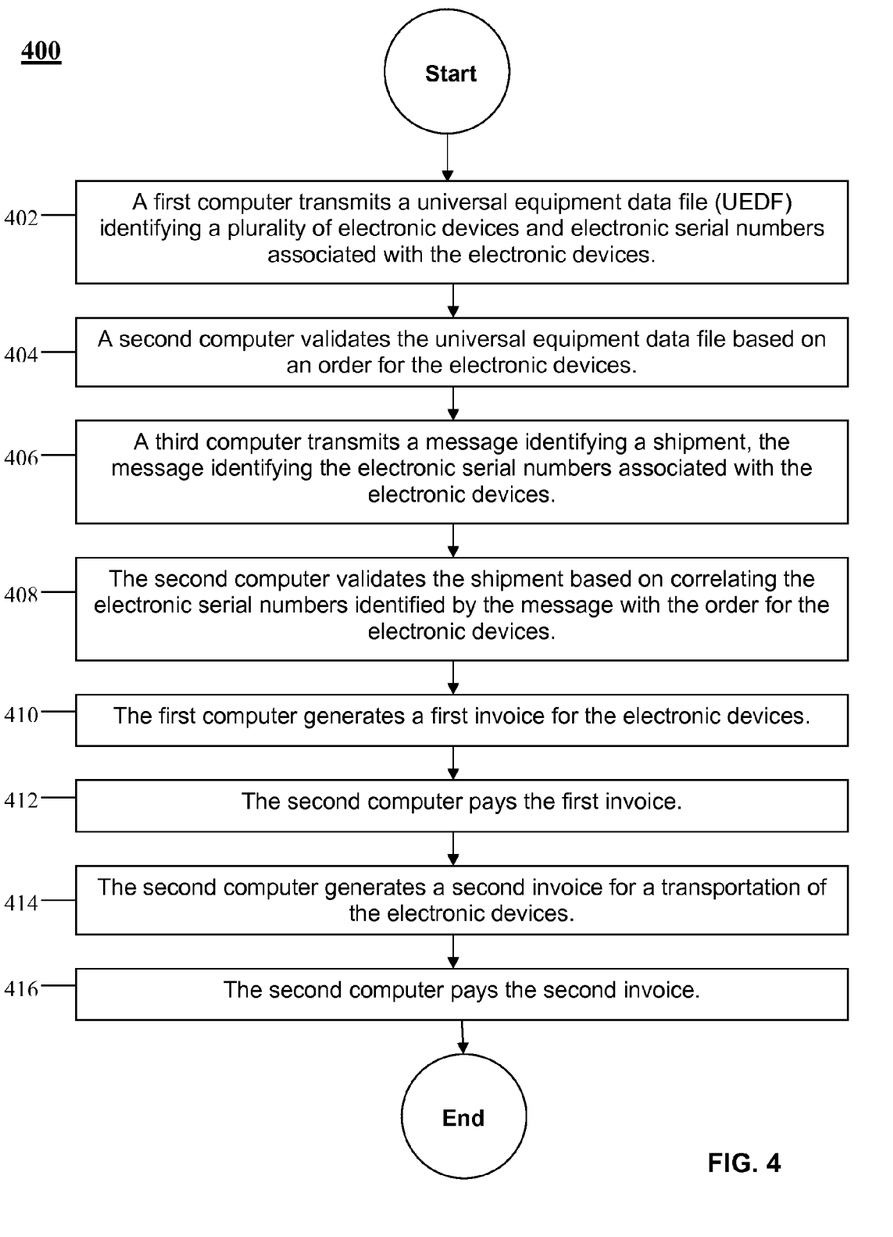
FIG. 4 is a flow chart illustrating a method according to an embodiment of the disclosure.

Turning now to FIG. 4, a method 400 of invoicing for business transactions is provided. Beginning at block 402, a first computer transmits a universal equipment data file identifying a plurality of electronic devices and electronic serial numbers associated with the electronic devices. The first computer may be associated with the manufacturer 150.

At block 404, a second computer validates the universal equipment data file based on an order for the electronic devices. The second computer may be the workflow server 110. At block 406, a third computer transmits a message identifying a shipment, the message identifying the electronic serial numbers associated with the electronic devices. The third computer may be associated with the telecommunications service provider 140 or the logistics provider 160.

At block 408, the second computer validates the shipment based on correlating the electronic serial numbers identified by the message with the order for the electronic devices. At block 410, the first computer generates a first invoice for the electronic devices.

At block 412, the second computer pays the first invoice. At block 414, the second computer generates a second invoice for a transportation of the electronic devices. At block 416, the second computer pays the second invoice.

Figure 5:
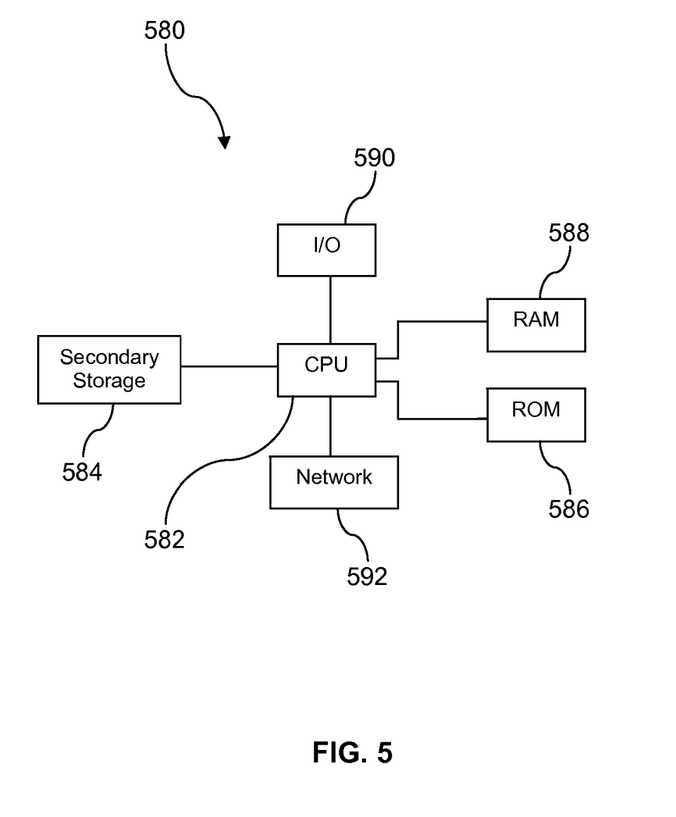
FIG. 5 illustrates an exemplary computer system suitable for implementing some aspects of the several embodiments of the disclosure.

FIG. 5 illustrates a computer system 580 suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming and/or loading executable instructions onto the computer system 580, at least one of the CPU 582, the RAM 588, and the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors.

In an embodiment, the computer system 580 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 580 to provide the functionality of a number of servers that is not directly bound to the number of computers in the computer system 580. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 580, at least portions of the contents of the computer program product to the secondary storage 584, to the ROM 586, to the RAM 588, and/or to other non-volatile memory and volatile memory of the computer system 580. The processor 582 may process the executable instructions and/or data in part by directly accessing the computer program product, for example by reading from a CD-ROM disk inserted into a disk drive peripheral of the computer system 580. The computer program product may comprise instructions that promote the loading and/or copying of data, data structures, files, and/or executable instructions to the secondary storage 584, to the ROM 586, to the RAM 588, and/or to other non-volatile memory and volatile memory of the computer system 580.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An automated method of managing a supply chain, comprising:

transmitting a purchase order for a plurality of electronic devices to a manufacturer computer associated with a manufacturer, wherein the purchase order specifies a requested range of electronic serial numbers to be assigned to the plurality of electronic devices;

uploading, by the manufacturer computer, a data file to a supply chain database, wherein the data file identifies the plurality of electronic devices associated with the purchase order and a range of electronic serial numbers assigned to the plurality of electronic devices;

comparing, by a telecommunications service provider computer associated with a telecommunications service provider that is purchasing the electronic devices from the manufacturer, the range of electronic serial numbers assigned to the plurality of electronic devices to the requested range of electronic serial numbers specified in the purchase order;

when the range of electronic serial numbers assigned to the plurality of electronic devices does not correlate to the requested range of electronic serial numbers specified in the purchase order, transmitting, by the telecommunications service provider computer, a message to the manufacturer computer indicating that the range of electronic serial numbers assigned to the plurality of electronic devices does not correlate to the requested range of electronic serial numbers specified in the purchase order;

when the range of electronic serial numbers assigned to the plurality of electronic devices correlates to the requested range of electronic serial numbers specified in the purchase order, transmitting, by the telecommunications service provider computer, a message to the manufacturer computer indicating that the range of electronic serial numbers assigned to the plurality of electronic devices correlates to the requested range of electronic serial numbers specified in the purchase order; and based on the manufacturer computer receiving the message indicating that the range of electronic serial numbers assigned to the plurality of electronic devices correlates to the requested range of electronic serial numbers specified in the purchase order, shipping the plurality of electronic devices.

2. The method of claim 1, wherein the supply chain database is associated with the telecommunications service provider.

3. The method of claim 1, wherein the electronic devices are one of mobile telephones, personal digital assistants (PDA), and media players.

4. The method of claim 1, further comprising receiving, by the telecommunications service provider computer, an advanced shipping notice (ASN) wherein the advanced shipping notice comprises shipping information.

5. The method of claim 4, wherein the shipping information comprises at least one of product stock-keeping units (SKU), product equipment serial numbers, product quantities, purchase order information, ship date(s), transportation carrier information, appointment for delivery, and data file name and number.

6. The method of claim 1, further including adjusting and retransmitting, by the manufacturer computer, the data file to the supply chain database upon receiving the message indicating that the range of electronic serial numbers assigned to the plurality of electronic devices does not correlate to the requested range of electronic serial numbers specified in the purchase order.

7. A processor-implemented method of procuring inventory, comprising:
   receiving, by a computer associated with a telecommunications service provider that is purchasing a plurality of electronic devices from a supplier, a first universal equipment data file (UEDF) from the supplier, wherein the universal equipment data file identifies a range of electronic serial numbers assigned to the plurality of electronic devices;
   comparing, by the computer, the range of electronic serial numbers assigned to the plurality of electronic devices with a requested range of electronic serial numbers specified in a first purchase order for the plurality of electronic devices;
   verifying, by the computer, that the range of electronic serial numbers assigned to the plurality of electronic devices correlates to the requested range of electronic serial numbers specified in the first purchase order;
   based on the computer successfully verifying that the range of electronic serial numbers assigned to the plurality of electronic devices correlates to the requested range of electronic serial numbers specified in the first purchase order, sending, by the computer, a confirmation message to the supplier, the confirmation message confirming the range of electronic serial numbers identified in the first universal equipment data file and instructing the supplier to ship the plurality of electronic devices specified in the first purchase order; and
   receiving, by the computer, a carrier message from a receiving component, the carrier message indicating that the plurality of electronic devices specified in the first purchase order has been received from a carrier, the carrier message further advising that the electronic serial numbers associated with the plurality of electronic devices match the range of electronic serial numbers identified in the first universal equipment data file.

8. The method of claim 7, further comprising:
   receiving, by the computer, a second universal equipment data file (UEDF) from the supplier, wherein the second universal equipment data file identifies a range of electronic serial numbers assigned to a second plurality of electronic devices;
   comparing, by the computer, the range of electronic serial numbers assigned to the second plurality of electronic devices with a requested range of electronic serial numbers specified in a second purchase order for the second plurality of electronic devices;
   determining, by the computer, that the range of electronic serial numbers assigned to the second plurality of electronic devices does not match the requested range of electronic serial numbers specified in the second purchase order; and
   notifying, by the computer, the supplier that the range of electronic serial numbers assigned to the second plurality of electronic devices does not match the requested range of electronic serial numbers specified in the second purchase order and further directing the supplier to not release shipment of the second plurality of electronic devices described in the second purchase order.

9. The method of claim 7, wherein the computer comprises an application that compares information about electronic devices described in universal equipment data files with information provided in purchase orders.

10. The method of claim 9, wherein the computer provides limited access to the application to at least one of the supplier, the carrier, a freight forwarding provider, and a logistics provider.

11. The method of claim 7, further comprising providing, by the computer, instructions to an accounting component to make payment to the supplier for an invoice amount in connection with the delivery of the plurality of electronic devices described in the first purchase order.

12. The method of claim 7, further comprising providing instructions, by the computer, to an accounting component to make payment to at least one of the carrier, a freight forwarding provider, and a logistics provider for transportation services in connection with the delivery of the plurality of electronic devices described in the first purchase order.

13. A computer based method of invoicing for business transactions, comprising:
   transmitting, by a manufacturer computer associated with a manufacturer, a universal equipment data file (UEDF) identifying a plurality of electronic devices and a range of electronic serial numbers assigned to the plurality of electronic devices;
   comparing, by a telecommunications service provider computer associated with a telecommunications service provider that is purchasing the plurality of electronic devices from the manufacturer, the range of electronic serial numbers assigned to the plurality of electronic devices to a requested range of electronic serial numbers specified in a purchase order;
   validating, by the telecommunications service provider computer, the universal equipment data file based on the range of electronic serial numbers assigned to the plurality of electronic devices correlating to the requested range of electronic serial numbers specified in the purchase order;
   transmitting, by a provider computer associated with one of the telecommunications service provider and a logistics provider, a message identifying a shipment of the plurality of electronic devices, the message identifying the range of electronic serial numbers associated with the plurality of electronic devices;
   validating, by the telecommunications service provider computer, the shipment based on the range of electronic serial numbers identified in the message correlating to the requested range of electronic serial numbers specified in the purchase order;
   generating, by the manufacturer computer, a first invoice for the plurality of electronic devices;

paying the first invoice;

generating, by the telecommunications service provider computer, a second invoice for a transportation of the plurality of electronic devices; and paying the second invoice.

14. The method of claim 13, wherein the manufacturer is an original equipment manufacturer (OEM) of the plurality of electronic devices.

15. The method of claim 13, further comprising transmitting a reference to the universal equipment data file as part of an advanced shipping notice (ASN) process.

16. The method of claim 15, further comprising initiating, by the manufacturer computer, the advanced shipping notice process upon receipt of the purchase order by the manufacturer computer.

17. The method of claim 13, wherein the first invoice is paid to the manufacturer and the second invoice is paid to a transportation provider.

18. The method of claim 13, further comprising notifying, by the telecommunications service provider computer, the manufacturer computer when the telecommunications service provider computer is unable to validate the universal equipment data file based on the range of electronic serial numbers assigned to the plurality of electronic devices not correlating to the requested range of electronic serial numbers specified in the purchase order.

* * * * *